(12) United States Patent
Takahashi et al.

(10) Patent No.: US 12,008,902 B2
(45) Date of Patent: Jun. 11, 2024

(54) PARKING ASSISTANCE DEVICE

(71) Applicant: HITACHI AUTOMOTIVE SYSTEMS, LTD., Hitachinaka (JP)

(72) Inventors: Koji Takahashi, Hitachinaka (JP); Sara Suda, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 57 days.

(21) Appl. No.: 17/253,787

(22) PCT Filed: Aug. 8, 2019

(86) PCT No.: PCT/JP2019/031320
§ 371 (c)(1),
(2) Date: Dec. 18, 2020

(87) PCT Pub. No.: WO2020/066329
PCT Pub. Date: Apr. 2, 2020

(65) Prior Publication Data
US 2021/0323538 A1    Oct. 21, 2021

(30) Foreign Application Priority Data
Sep. 27, 2018    (JP) .................................. 2018-182263

(51) Int. Cl.
G08G 1/14    (2006.01)
B60R 1/27    (2022.01)
(Continued)

(52) U.S. Cl.
CPC ............. G08G 1/143 (2013.01); B60R 1/27 (2022.01); B60W 30/06 (2013.01);
(Continued)

(58) Field of Classification Search
CPC .. B60W 30/06; B60W 2552/00; B60W 10/04; B60W 10/10; B60W 10/18;
(Continued)

(56) References Cited

U.S. PATENT DOCUMENTS 10,081,390 B1 * 9/2018 Anderson .............. G08G 1/168
2009/0085771 A1 * 4/2009 Wu .................... B62D 15/0285
348/148

(Continued)

FOREIGN PATENT DOCUMENTS

JP    2010-018180 A    1/2010
JP    2010018180 A  *  1/2010
(Continued)

OTHER PUBLICATIONS

Machine Translation JP 2010018180 (Year: 2010).*
(Continued)

*Primary Examiner* — Aaron L Troost
(74) *Attorney, Agent, or Firm* — Volpe Koenig

(57) ABSTRACT

In a method of detecting a parkable space using only a sonar installed on a side of a vehicle, automatic parking assistance cannot be implemented at an early stage, and an environment in which automatic parking assistance is possible is limited. In a parking assistance device including a parkable space setting unit that sets a parkable space existing ahead of the vehicle based on information from a front detector, the parkable space setting unit corrects the parkable space based on information on the parkable space acquired by a side detector when the vehicle passes by the parkable space.

9 Claims, 22 Drawing Sheets

(51) Int. Cl.
*B60W 10/04* (2006.01)
*B60W 10/10* (2012.01)
*B60W 10/18* (2012.01)
*B60W 10/20* (2006.01)
*B60W 30/06* (2006.01)
*G06V 10/147* (2022.01)
*G06V 20/58* (2022.01)

(52) U.S. Cl.
CPC .......... *G06V 10/147* (2022.01); *G06V 20/586* (2022.01); *B60W 10/04* (2013.01); *B60W 10/10* (2013.01); *B60W 10/18* (2013.01); *B60W 10/20* (2013.01); *B60W 2420/403* (2013.01); *B60W 2552/00* (2020.02)

(58) Field of Classification Search
CPC .. B60W 10/20; B60W 2420/42; G08G 1/143; G08G 1/168; G08G 1/165; B60R 2300/806; B60R 1/00; B62D 15/0285; G06V 10/147; G06V 20/586; G05D 1/0061; G05D 1/0088; G05D 1/021; G05D 1/0214; G05D 1/0221; G05D 1/0223

See application file for complete search history.

(56) References Cited

U.S. PATENT DOCUMENTS

2017/0043808 A1* 2/2017 Yang .................... B62D 15/021
2021/0253090 A1* 8/2021 Hayakawa ............ B60W 50/08

FOREIGN PATENT DOCUMENTS

| JP | 2014-189266 A | | 10/2014 |
| JP | 2014189266 A | * | 10/2014 |
| JP | 2015-214223 A | | 12/2015 |

OTHER PUBLICATIONS

Machine Transition JP 2014189266 (Year: 2014).*
International Search Report, PCT/JP2019/031320 dated Oct. 8, 2019, 1 pg.
Chinese Office Action issued on Jan. 3, 2024 for Chinese Patent Application No. 201980047929.0.

* cited by examiner

PARKING ASSISTANCE DEVICE

TECHNICAL FIELD

The present invention relates to a device for parking a vehicle according to a result of recognition of an outside of a vehicle.

BACKGROUND ART

In recent years, a technique for early detection of a parkable space has been developed using a sensor that detects an obstacle ahead of a vehicle. PTL 1 discloses a parking assistance device that "detects an obstacle existing ahead of a vehicle by a peripheral monitoring sensor, and then detects an obstacle existing around the vehicle by a distance sensor, and when an obstacle is detected by the peripheral monitoring sensor, based on an obstacle detectable range of the distance sensor, calculates a route through which the vehicle passes near the obstacle detected by the peripheral monitoring sensor according to control of system electronic control unit (ECU), and guides the vehicle".

CITATION LIST

Patent Literature

PTL 1: JP 2010-18180 A

SUMMARY OF INVENTION

Technical Problem

The technique described in PTL 1 enables reliable detection of a parkable space by generating a route. However, a commonly used method of detecting a parkable space using only a sonar installed on a side of a vehicle requires that the sonar on the side of the vehicle pass the parkable space, and an environment in which parking assistance can be provided is limited.

Solution to Problem

A typical example of the invention disclosed in the present application is as follows.

That is, in a parking assistance device including a parkable space setting unit that sets a parkable space existing ahead of a vehicle based on information from a front detector, the parkable space setting unit corrects the parkable space based on information on the parkable space acquired by a side detector when the vehicle passes by the parkable space.

Advantageous Effects of Invention

According to one embodiment of the present invention, parking assistance can be started early. Problems, configurations, and effects other than those described above will be clarified by the following description of the examples.

DESCRIPTION OF EMBODIMENTS

Figure 1:
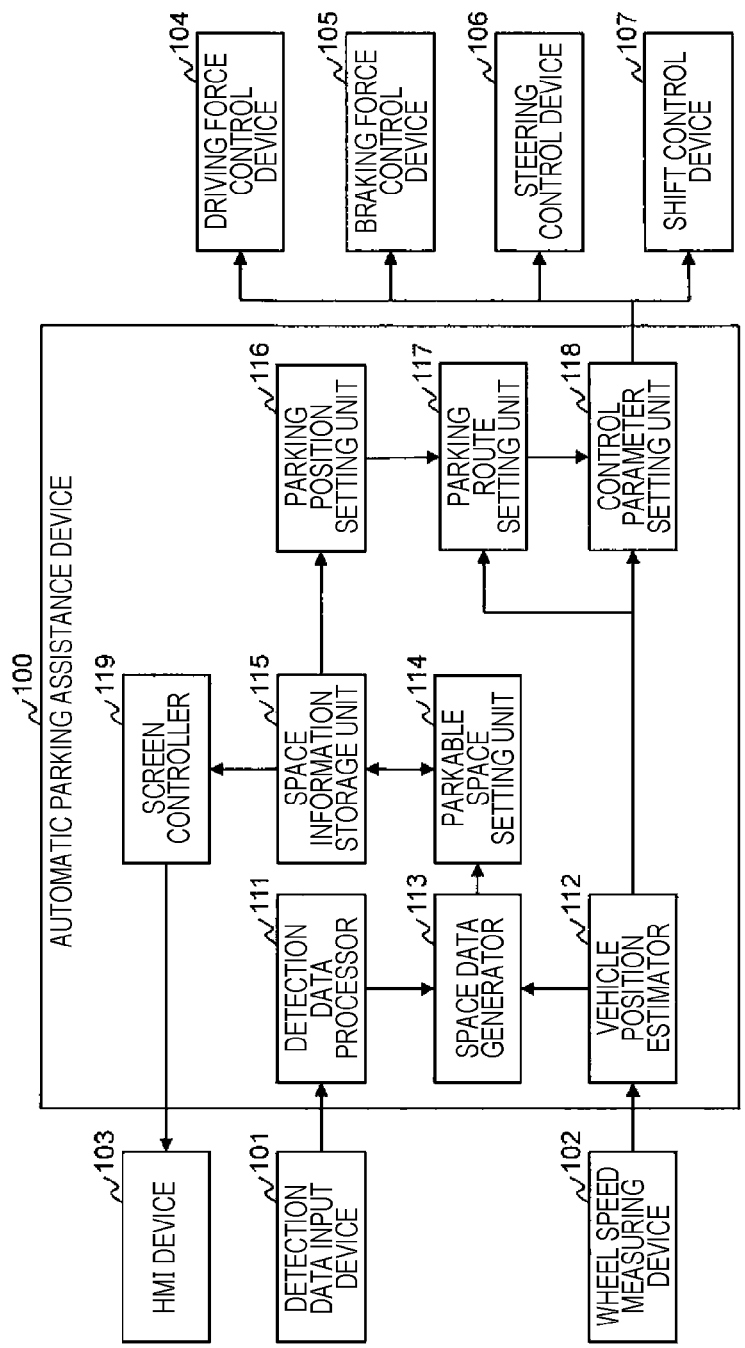
FIG. 1 is a diagram showing a configuration example of an automatic parking assistance device of Example 1.
Figure 2:
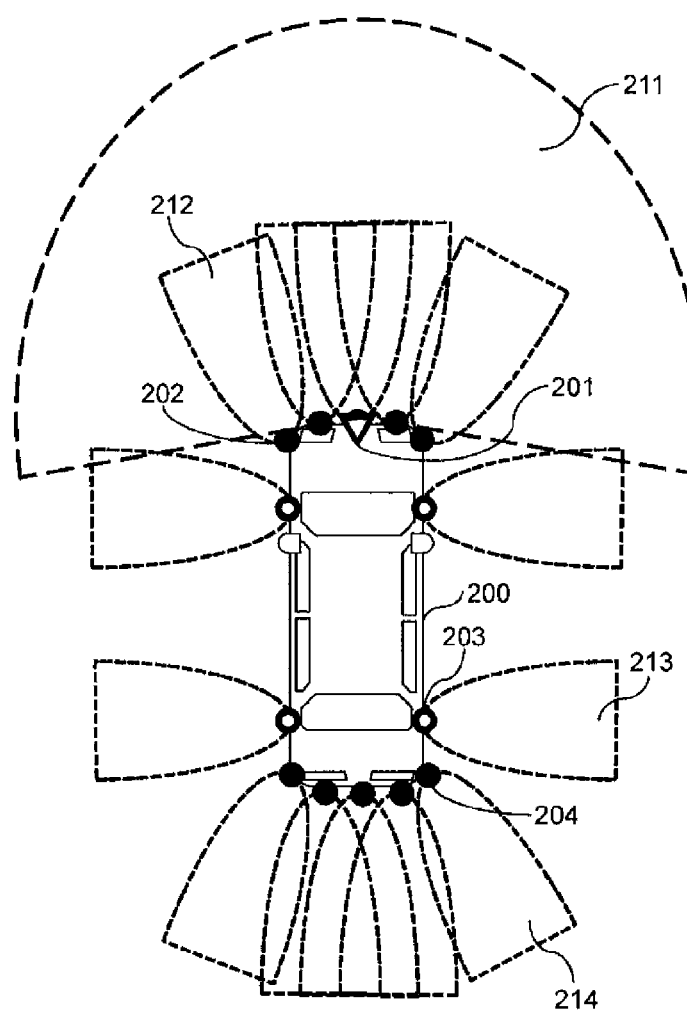
FIG. 2 is a diagram showing an example of installation positions and detection ranges of detectors included in a vehicle of Example 1.
Figure 3A:
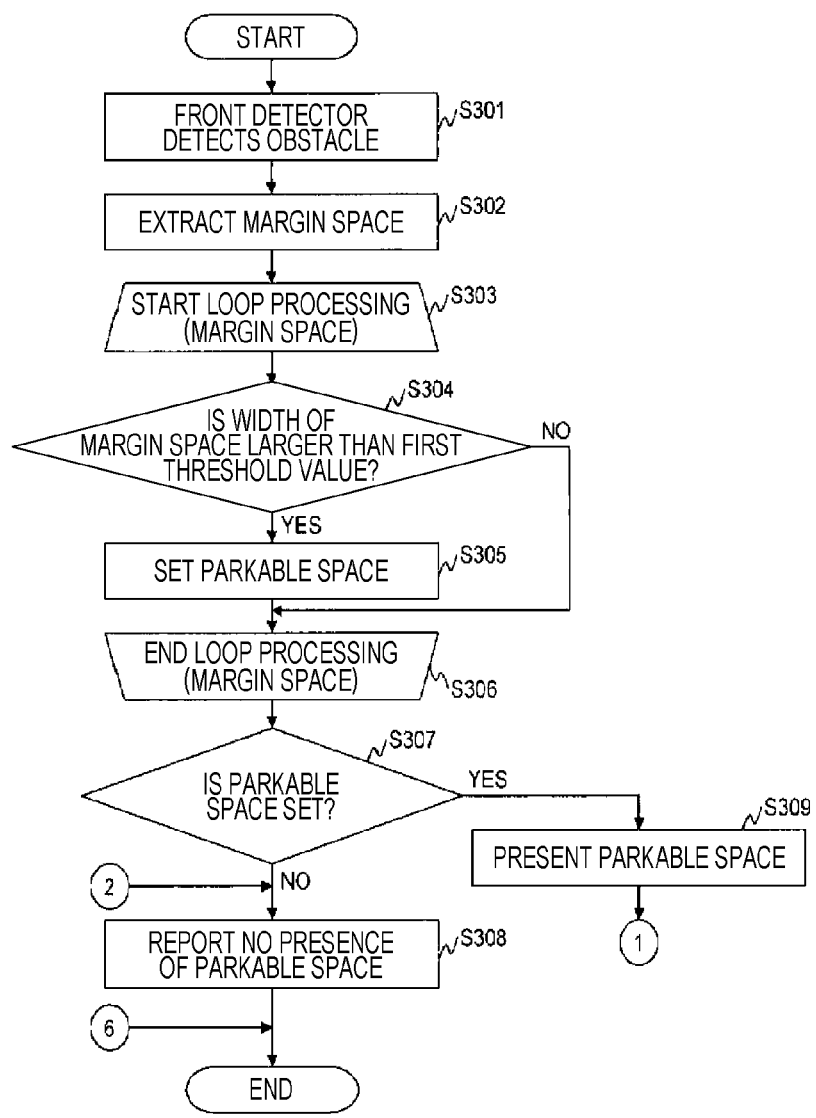
FIG. 3A is a flowchart explaining automatic parking control in the vehicle of Example 1.
Figure 3B:
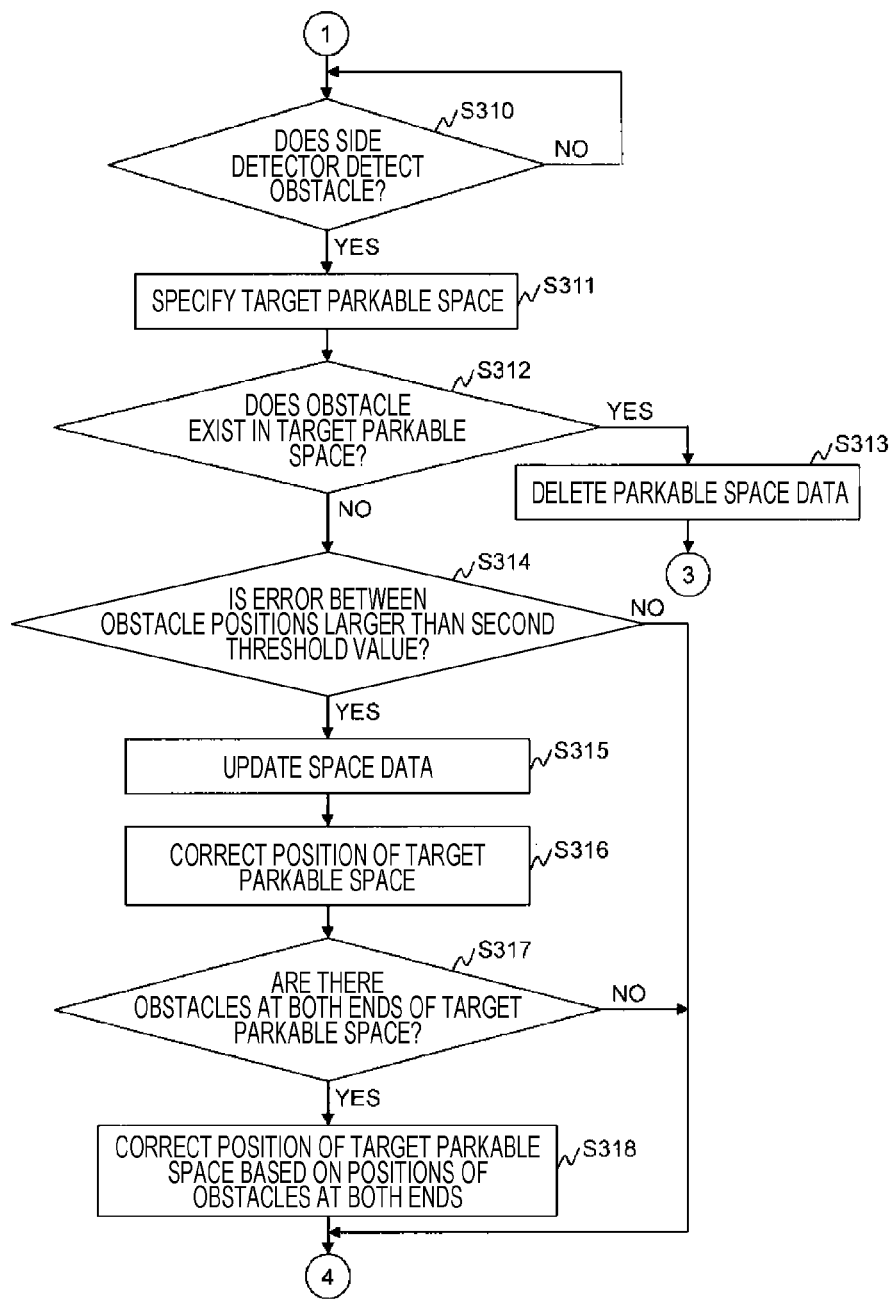
FIG. 3B is a flowchart explaining the automatic parking control in the vehicle of Example 1.
Figure 3C:
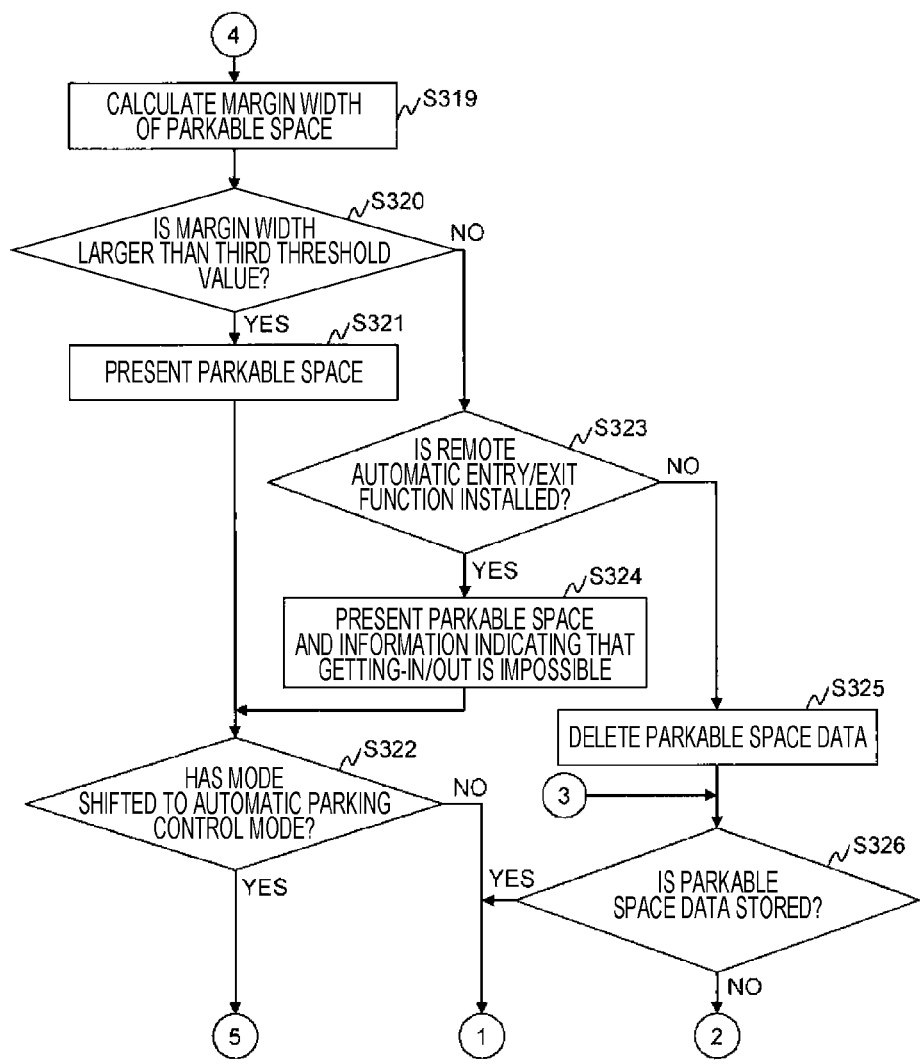
FIG. 3C is a flowchart explaining the automatic parking control in the vehicle of Example 1.
Figure 3D:
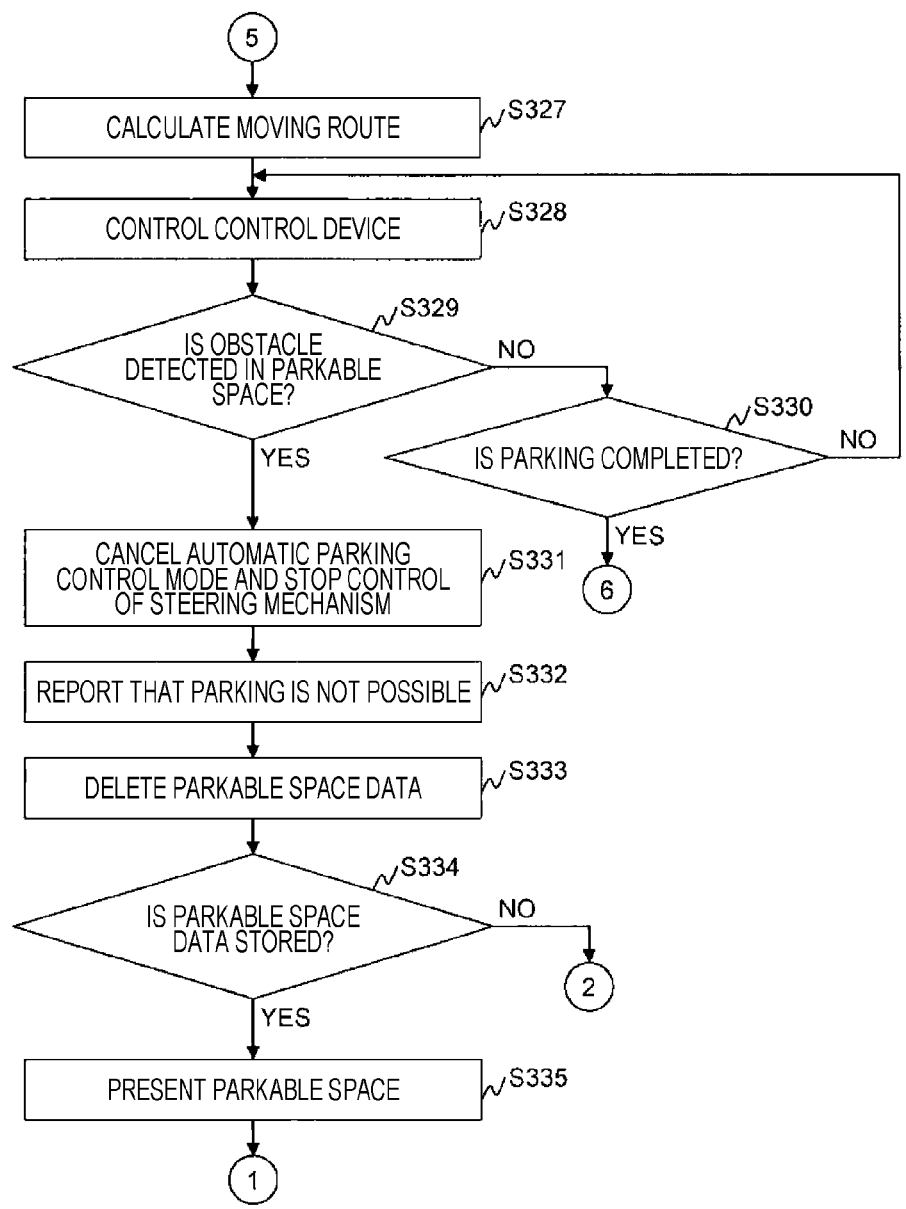
FIG. 3D is a flowchart explaining the automatic parking control in the vehicle of Example 1.

FIG. 1 is a diagram showing a configuration example of an automatic parking assistance device of Example 1. FIG. 2 is a diagram showing an example of installation positions and detection ranges of detectors included in a vehicle of Example 1.

A vehicle 200 has a front detector 201, a front ranging unit 202, a side detector 203, and a rear detector 204.

The front detector 201 is installed in a front part of the vehicle 200 and detects a parkable space ahead of the vehicle 200. In this example, it is assumed that a shape of the parkable space is rectangular. The front detector 201 is configured by using, for example, a radar, a camera, or the like. A detection range 211 represents a range that can be detected by the front detector 201.

The front ranging unit 202 is installed in the front part of the vehicle 200, detects an obstacle existing ahead of the vehicle 200, and calculates a distance from the vehicle 200 to the obstacle. The front ranging unit 202 is configured by using, for example, a camera, an ultrasonic sonar, a radar, a light detection and ranging (LiDAR), a millimeter wave radar, or the like. A detection range 212 represents a range that can be detected by the front ranging unit 202.

The side detector 203 is installed on each of a right side and a left side of the vehicle 200, detects obstacles existing on the left and right sides of the vehicle 200, and calculates distances from the vehicle 200 to the obstacles. The side detector 203 is configured by using, for example, an ultrasonic sonar, a radar, a LiDAR, a millimeter wave radar, or the like. A detection range 213 represents a range that can be detected by the side detector 203.

The rear detector 204 is installed in a rear part of the vehicle 200, detects an obstacle existing behind the vehicle 200, and calculates a distance from the vehicle 200 to the obstacle. The rear detector 204 is configured by using, for example, an ultrasonic sonar, a radar, a LiDAR, a millimeter wave radar, or the like. A detection range 214 represents a range that can be detected by the rear detector 204.

The present invention is not limited to the number and installation positions of the front detector 201, the front ranging unit 202, the side detector 203, and the rear detector 204.

The vehicle 200 has an automatic parking assistance device 100, a detection data input device 101, a wheel speed measuring device 102, a human machine interface (HMI) device 103, a driving force control device 104, a braking force control device 105, a steering control device 106, and a shift control device 107 as a configuration for realizing an automatic parking mechanism.

The automatic parking assistance device 100 comprehensively controls the automatic parking mechanism. The automatic parking assistance device 100 includes an arithmetic device, a storage device, and an interface. The detailed configuration of the automatic parking assistance device 100 will be described later.

The detection data input device 101 acquires detection data from the front detector 201, the front ranging unit 202, the side detector 203, and the rear detector 204, and inputs the detection data to the automatic parking assistance device 100.

The wheel speed measuring device 102 measures moving speed of the vehicle 200 and inputs a measurement result to the automatic parking assistance device 100.

The HMI device 103 presents various types of information to a driver. In Example 1, the HMI device 103 is presented with information about a parkable space as a candidate parking position. The driving force control device 104, the braking force control device 105, the steering control device 106, and the shift control device 107 are a group of devices that control a movement of the vehicle 200.

Here, the detailed configuration of the automatic parking assistance device 100 will be described. The automatic parking assistance device 100 includes a detection data processor 111, a vehicle position estimator 112, a space data generator 113, a parkable space setting unit 114, a space information storage unit 115, a parking position setting unit 116, a parking route setting unit 117, a control parameter setting unit 118, and a screen controller 119.

When the detection data is input from the detection data input device 101, the detection data processor 111 processes the detection data. The detection data processor 111 executes, for example, data format conversion of the detection data, data extraction, and the like. The detection data processor 111 outputs the processed detection data to the space data generator 113.

The vehicle position estimator 112 estimates a position of the vehicle 200 from the moving speed of the vehicle 200. The vehicle position estimator 112 outputs information about the estimated position of the vehicle 200 to the space data generator 113, the parking route setting unit 117, and the control parameter setting unit 118.

When at least one of the detection data and the information about the estimated position of the vehicle 200 is input, the space data generator 113 generates space data representing arrangement of obstacles and the like around the vehicle 200 based on the input information. The space data generator 113 outputs the generated space data to the parkable space setting unit 114.

When the space data is input, the parkable space setting unit 114 extracts a parkable space by analyzing the space data and generates parkable space data. The parkable space setting unit 114 stores the space data and the parkable space data in the space information storage unit 115.

Further, the parkable space setting unit 114 corrects the parkable space, after outputting the data to the space information storage unit 115, when new space data is input. The parkable space setting unit 114 acquires the parkable space data from the space information storage unit 115, and updates the parkable space data based on a correction result. Further, the parkable space setting unit 114 stores the new space data and the updated parkable space data in the space information storage unit 115.

The space information storage unit 115 stores the space data and the parkable space data.

When any of presented parkable spaces is specified by the driver, the parking position setting unit 116 acquires the space data and the parkable space data of the specified parkable space from the space information storage unit 115, and outputs the acquired space data and parkable space data to the parking route setting unit 117.

The parking route setting unit 117 calculates a moving route for parking the vehicle 200 in the parkable space specified by the driver when the space data, the parkable space data, and the information about the estimated position of the vehicle 200 are input. The parking route setting unit 117 outputs data of the calculated moving route to the control parameter setting unit 118.

When the information about the estimated position of the vehicle 200 and the data of the moving route are input, the control parameter setting unit 118 calculates control parameters of various control devices for driving the vehicle 200 according to the moving route. The control parameter setting unit 118 outputs the control parameters to each control device.

The screen controller 119 generates display information on a screen to be displayed on the HMI device 103 by using the space data and the parkable space data stored in the space information storage unit 115.

FIGS. 3A, 3B, 3C, and 3D are flowcharts explaining automatic parking control in the vehicle 200 of Example 1.

The front detector 201 detects an obstacle within the detection range 211 (step S301). The detection data input device 101 acquires detection data including information on the position of the obstacle from the front detector 201, and inputs the detection data to the automatic parking assistance device 100. The detection data is processed by the detection data processor 111 and the space data generator 113, and is output as space data to the parkable space setting unit 114.

Next, the automatic parking assistance device 100 estimates one or more margin spaces using the space data (step S302). Specifically, the following processing is executed.

The parkable space setting unit 114 generates pairs of obstacles existing in the vicinity.

The parkable space setting unit 114 selects one pair of obstacles and extracts a margin space existing between the two obstacles based on end points of the two obstacles. The parkable space setting unit 114 performs the same processing for all obstacle pairs. The parkable space setting unit 114 temporarily stores information on the margin space in a storage device.

Here, the end points of each obstacle represent vertices of a rectangular region where the obstacle exists. In this example, a vertex of a side of the rectangular region in contact with a region where the vehicle 200 can move is used for processing.

The parkable space setting unit 114 extracts, for example, a rectangular space having one side parallel and one side perpendicular to a straight line connecting end points of obstacles forming a pair as a margin space.

When there is no pair of obstacles, the parkable space setting unit 114 estimates a space of a certain size from a space adjacent to one obstacle as a margin space. The above is the description of the processing of step S302.

Next, the automatic parking assistance device 100 starts loop processing of the margin space (step S303). Specifically, the parkable space setting unit 114 selects a target margin space from an estimated margin space.

Next, the automatic parking assistance device 100 determines whether or not a width of the target margin space is larger than a first threshold value (step S304). Here, the width of the margin space represents a size of the side of the margin space perpendicular to a direction in which the vehicle 200 is parked (for example, the distance between the end points of two obstacles). It is assumed that the first threshold value is set in advance. The processing of step S304 is processing for determining whether or not a parkable space can be set in the margin space.

When it is determined that the width of the target margin space is equal to or less than the first threshold value, the automatic parking assistance device 100 proceeds to step S306. In this case, information on the target margin space may be deleted from the storage device.

When it is determined that the width of the target margin space is larger than the first threshold value, the automatic parking assistance device 100 sets a parkable space in the target margin space (step S305). After that, the automatic parking assistance device 100 proceeds to step S306.

For example, the automatic parking assistance device 100 sets a parkable space on the target margin space so that a center of a width of the vehicle 200 in the parkable space overlaps a center of the width of the target margin space. Further, the automatic parking assistance device 100 sets the parkable space on the target margin space so as to have a margin at a certain distance from an end point of one obstacle. The automatic parking assistance device 100 generates parkable space data of the set parkable space, and stores the parkable space data in the space information storage unit 115.

When the margin space is sufficiently large, the automatic parking assistance device 100 may perform control to set two or more parkable spaces.

In step S306, the automatic parking assistance device 100 determines whether or not the processing is completed for all the margin spaces.

When it is determined that the processing has not been completed for all the margin spaces, the automatic parking assistance device 100 returns to step S303 and executes the same processing.

When it is determined that the processing is completed for all the margin spaces, the automatic parking assistance device 100 determines whether or not at least one parkable space is set (step S307).

Specifically, the parkable space setting unit 114 determines whether or not data of at least one parkable space is stored in the space information storage unit 115. When data of at least one parkable space is stored in the space information storage unit 115, the parkable space setting unit 114 determines that at least one parkable space is set.

When it is determined that at least one parkable space is not set, the automatic parking assistance device 100 reports the driver via the HMI device 103 that there is no parkable space (step S308), and then, ends the processing.

The reporting is executed by the screen controller 119. For example, the screen controller 119 controls the screen of the HMI device 103 to display a character string indicating that there is no parkable space. The reporting method may be screen display, voice, or the like.

When it is determined that at least one parkable space is set, the automatic parking assistance device 100 presents the parkable space to the driver via the HMI device 103 (step S309).

Specifically, the screen controller 119 generates display data for displaying a screen indicating the parkable space and outputs the display data to the HMI device 103. When a plurality of parkable spaces is detected, the screen controller 119 may perform control to display only the parkable space closest to the vehicle 200, or display the plurality of parkable spaces. The side detector 203 monitors obstacles within the detection range 213 while the vehicle 200 is moving.

The automatic parking assistance device 100 of this example can present a parkable space to the driver before an obstacle is passed by setting the parkable space using the front detector 201. By referring to the screen displayed on the HMI device 103, the driver can start an operation for moving the vehicle 200 to the parkable space at an early stage.

The automatic parking assistance device 100 periodically determines whether or not an obstacle is detected by the side detector 203 (step S310).

Specifically, the automatic parking assistance device 100 determines whether or not the detection data including information on an obstacle detected by the side detector 203 is input via the detection data input device 101. When the detection data is input, the automatic parking assistance device 100 determines that an obstacle is detected by the side detector 203.

When it is determined by the side detector 203 that no obstacle is detected, the automatic parking assistance device 100 shifts to a waiting state until the next cycle, and returns to step S310 after a certain period of time elapses. The vehicle 200 continues to move even in the waiting state.

When it is determined that an obstacle is detected by the side detector 203, the automatic parking assistance device 100 specifies the parkable space related to the detected obstacle as a target parkable space (step S311).

Specifically, the parkable space setting unit 114 refers to the parkable space data and specifies the parkable space closest to a position of the detected obstacle as the target parkable space. At this time, the parkable space setting unit 114 stores identification information in the parkable space data and information on the detected obstacle (coordinates of end points) in a storage area in association with each other.

Next, the automatic parking assistance device 100 determines whether or not an obstacle exists in the target parking space (step S312).

When it is determined that an obstacle exists in the target parking space, the automatic parking assistance device 100 deletes the parkable space data of the target parkable space (step S313), and then proceeds to step S326. At this time, the screen controller 119 generates display data of a screen on which the parkable space corresponding to the deleted parkable space data is not displayed, and outputs the display data to the HMI device 103. As a result, control can be performed so as not to present a dangerous parkable space.

When it is determined that no obstacle exists in the target parking space, the automatic parking assistance device 100 determines whether an error between a position of the obstacle measured by the front detector 201 and a position of the obstacle measured by the side detector 203 is larger than a second threshold value (step S314). That is, it is determined whether or not the parkable space needs to be corrected.

Specifically, the automatic parking assistance device 100 calculates an error between coordinates of the obstacle included in the space data stored in the space information storage unit 115 and coordinates of the obstacle included in the detection data, and determines whether the error is larger than the second threshold value.

When the error is larger than the second threshold value, it is indicated that the parkable space needs to be corrected. It is assumed that the second threshold value is set in advance.

When it is determined that the error between the position of the obstacle measured by the front detector 201 and the position of the obstacle measured by the side detector 203 is equal to or less than the second threshold value, the automatic parking assistance device 100 proceeds to step S319.

When it is determined that the error between the position of the obstacle measured by the front detector 201 and the position of the obstacle measured by the side detector 203 is larger than the second threshold value, the automatic parking assistance device 100 updates the space data (step S315).

Specifically, the parkable space setting unit 114 acquires the space data from the space information storage unit 115, and updates the coordinates of the position of the detected obstacle included in the space data.

Next, the automatic parking assistance device 100 corrects the position of the target parkable space based on a difference in the positions of the obstacles (step S316). That is, the position of the target parkable space is corrected as coordinates of an end point of an adjacent obstacle are updated.

Specifically, the parkable space setting unit 114 updates the parkable space data of the target parkable space based on the error, and the space information storage unit 115 stores the updated parkable space data.

Next, the automatic parking assistance device 100 determines whether or not there are obstacles at both ends of the target parkable space (step S317).

Specifically, the parkable space setting unit 114 acquires the space data and the parkable space data of the target parkable space from the space information storage unit 115, and determines whether or not there are obstacles at both ends of the target parkable space. Obstacles whose distances from the parkable space are smaller than an arbitrary threshold value L are considered to be obstacles. Therefore, obstacles that exist at a distance greater than the threshold value L are not treated as obstacles in this step.

When it is determined that there is no obstacle at one of the ends of the target parkable space, the automatic parking assistance device 100 proceeds to step S319.

When it is determined that there are obstacles at both ends of the target parkable space, the automatic parking assistance device 100 waits for an input of detection data regarding another obstacle, and when the detection data is input, the automatic parking assistance device 100 corrects the position of the target parkable space based on the positions of the obstacles at both ends (step S318). That is, the position of the target parkable space is corrected based on a distance from an end point of adjacent obstacles. After that, the automatic parking assistance device 100 proceeds to step S319. Specifically, the following processing is executed.

The parkable space setting unit 114 obtains an intersection with a vertical line drawn from a left end point of an obstacle located on a right side (far side with respect to an advancing direction) of the target parkable space to a tangent line indicating the advancing direction of the vehicle 200 on the moving route, and calculates the distance between the end point and the intersection as distance dist_R.

The parkable space setting unit 114 obtains an intersection with a vertical line drawn from a right end point of an obstacle located on a left side (near side with respect to the advancing direction) of the target parkable space to the tangent line indicating the advancing direction of the vehicle 200 on the moving route, and calculates the distance between the end point and the intersection as distance dist_L.

The parkable space setting unit 114 compares dist_L and dist_R, and corrects the position of the target parkable space based on the comparison result.

For example, when dist_L is smaller than dist_R, the parkable space setting unit 114 corrects the position of the target parkable space with reference to the right end point of the obstacle located on the left side.

When dist_R is smaller than dist_L, the parkable space setting unit 114 corrects the position of the target parkable space with reference to the left end point of the obstacle located on the right side.

When the detection data related to other obstacles is not input even after a certain period of time elapses, the parkable space setting unit 114 may proceed to step S319 without executing processing of step S318. The above is the description of the processing of step S318.

Next, the automatic parking assistance device 100 calculates a margin width when the vehicle 200 is parked in the target parkable space (step S319).

Specifically, the parkable space setting unit 114 calculates the margin width using coordinates of a planned getting-out position of the vehicle 200 in the parkable space, a width of the vehicle 200, and coordinates of end points of adjacent obstacles.

Next, the automatic parking assistance device 100 determines whether or not the margin width is larger than a third threshold value (step S320). That is, when the vehicle 200 is parked in the parkable space, it is determined whether or not an occupant can secure a getting-in/getting-out space for getting in and out of the vehicle 200. When the margin width is larger than the third threshold value, it is indicated that the getting-in/getting-out space can be secured. It is assumed that the third threshold value is set in advance.

When it is determined that the margin width is larger than the third threshold value, the automatic parking assistance device 100 presents the driver with the corrected parkable space via the HMI device 103 (step S321). After that, the automatic parking assistance device 100 proceeds to step S322.

Specifically, the screen controller 119 generates display data for displaying a screen showing the corrected parkable space and indicating that it is possible to get in and out of the vehicle 200 on the HMI device 103, and outputs the display data to the HMI device 103. For example, colors, characters, voices, etc. are used to report that the parkable space has been corrected, and that it is possible to get in and out of the vehicle 200. As a result, it is possible to accurately detect the parkable space without making the driver aware of driving. Further, since the driver can distinguish the corrected parkable space from the uncorrected parkable space, information for selecting the parkable space can be provided.

When it is determined that the margin width is equal to or less than the third threshold value, the automatic parking assistance device 100 determines whether or not a remote automatic entry/exit function is installed in the vehicle 200 (step S323).

When it is determined that the remote automatic entry/exit function is installed, the automatic parking assistance device 100 presents the driver with information indicating that the driver cannot get in and out of the vehicle 200 and the corrected parkable space via the HMI device 103 (step S324). After that, the automatic parking assistance device 100 proceeds to step S322.

Specifically, the screen controller 119 generates display data for displaying a screen showing the corrected parkable space and indicating that it is impossible to get in and out of the vehicle 200 on the HMI device 103, and outputs the display data to the HMI device 103. For example, colors, characters, voices, etc. are used to report that the parkable space has been corrected, and that it is impossible to get in and out of the vehicle 200. As a result, it is possible to encourage the driver to park the vehicle 200 using the remote automatic entry/exit function.

In step S322, the automatic parking assistance device 100 determines whether or not a mode has shifted to an automatic parking control mode (step S322).

For example, when any of the parkable spaces is specified as a parking position by the driver, the automatic parking assistance device 100 determines that the mode has shifted to the automatic parking control mode. At this time, the parking position setting unit 116 acquires space data and parkable space data of the specified parkable space from the space information storage unit 115, and outputs the acquired data to the parking route setting unit 117.

The automatic parking assistance device 100 may perform control so that only the corrected parkable space can be specified as the parking position.

When it is determined that the mode has not shifted to the automatic parking control mode, the automatic parking assistance device 100 returns to step S310 and executes the same processing.

When it is determined that the mode has shifted to the automatic parking control mode, the automatic parking assistance device 100 proceeds to step S327.

When it is determined in step S323 that the remote automatic entry/exit function is not installed, the automatic parking assistance device 100 deletes the parkable space data of the target parkable space (step S325).

Specifically, the parkable space setting unit 114 deletes the parkable space data of the target parkable space stored in the space information storage unit 115. At this time, the screen controller 119 generates display data of a screen on which the parkable space corresponding to the deleted parkable space data is not displayed, and outputs the display data to the HMI device 103. As a result, control can be performed so as to present only the parkable space where getting in and out is possible.

Next, the automatic parking assistance device 100 determines whether or not the parkable space data is stored in the space information storage unit 115 (step S326).

When it is determined that the parkable space data is stored in the space information storage unit 115, the automatic parking assistance device 100 returns to step S310 and executes the same processing.

When it is determined that the parkable space data is not stored in the space information storage unit 115, the automatic parking assistance device 100 proceeds to step S308.

When it is determined in step S322 that the mode has shifted to the automatic parking control mode, the automatic parking assistance device 100 calculates the moving route (step S327).

Specifically, the parking route setting unit 117 calculates the moving route based on the space data, the parkable space data, and the information about the estimated position of the vehicle 200.

Next, the automatic parking assistance device 100 controls each control device in order to move the vehicle 200 to the parking position according to the moving route (step S328).

Specifically, the control parameter setting unit 118 calculates control parameters of each control device based on the moving route and the information about the estimated position of the vehicle 200.

The control parameter setting unit 118 controls each control device by outputting the calculated control parameters to each control device.

Next, the automatic parking assistance device 100 periodically determines whether or not an obstacle is detected at the parking position during parking control (step S329).

Specifically, the automatic parking assistance device 100 determines whether or not the detection data including information on an obstacle detected by the front detector 201, the side detector 203, or the rear detector 204 is input via the detection data input device 101. When the detection data is input, the automatic parking assistance device 100 determines that an obstacle has been detected at the parking position by the side detector 203 or the rear detector 204.

When it is determined that no obstacle is detected at the parking position, the automatic parking assistance device 100 determines whether or not parking is completed (step S330). That is, it is determined whether or not the vehicle 200 has moved to the parking position.

When it is determined that parking is not completed, the automatic parking assistance device 100 returns to step S328 and executes the same processing.

When it is determined that parking is completed, the automatic parking assistance device 100 ends the processing.

When it is determined in step S329 that an obstacle is detected at the parking position, the automatic parking assistance device 100 cancels the automatic parking control mode and stops the control of the control device (step S331). That is, the vehicle 200 is stopped.

Next, the automatic parking assistance device 100 reports the driver via the HMI device 103 that the vehicle 200 cannot be parked at the parking position (step S332), and deletes the parkable space data of the specified parkable space (step S333).

Specifically, the parkable space setting unit 114 deletes the parkable space data of the specified parkable space from the space information storage unit 115. Further, the screen controller 119 generates display data of a screen on which the parkable space corresponding to the deleted parkable space data is not displayed and that the vehicle 200 cannot be parked at the parking position is displayed, and outputs the display data to the HMI device 103. As a result, control can be performed so as not to present a dangerous parkable space.

At this time, the automatic parking assistance device 100 may control the control device to control the vehicle 200 so that the vehicle 200 returns to its original position before parking. The driver may manually control the vehicle 200 as described above.

Next, the automatic parking assistance device 100 determines whether or not the parkable space data is stored in the space information storage unit 115 (step S334).

When it is determined that the parkable space data is stored in the space information storage unit 115, the automatic parking assistance device 100 presents the parkable space to the driver via the HMI device 103 (step S335). After that, the automatic parking assistance device 100 returns to step S310 and executes the same processing.

When it is determined that the parkable space data is not stored in the space information storage unit 115, the automatic parking assistance device 100 returns to step S308 and executes the same processing.

The farther the front detector 201 is from the parkable space, the greater the influence of recognition performance and environmental disturbance are. Therefore, there is a problem that an error occurs in the position of the parkable space.

On the other hand, when only the side detector 203 is used, the parkable space can be accurately detected, but it is necessary to pass by the parkable space. Therefore, there is a problem that the parkable space cannot be presented to the driver at an early stage.

According to the present invention, the front detector 201 and the side detector 203 are used to present a parkable space at an early stage, and dynamically correct the position of the parkable space to improve the detection accuracy of the parkable space.

Next, the automatic parking control of the vehicle 200 of Example 1 will be described with reference to specific examples.

Figure 4A:
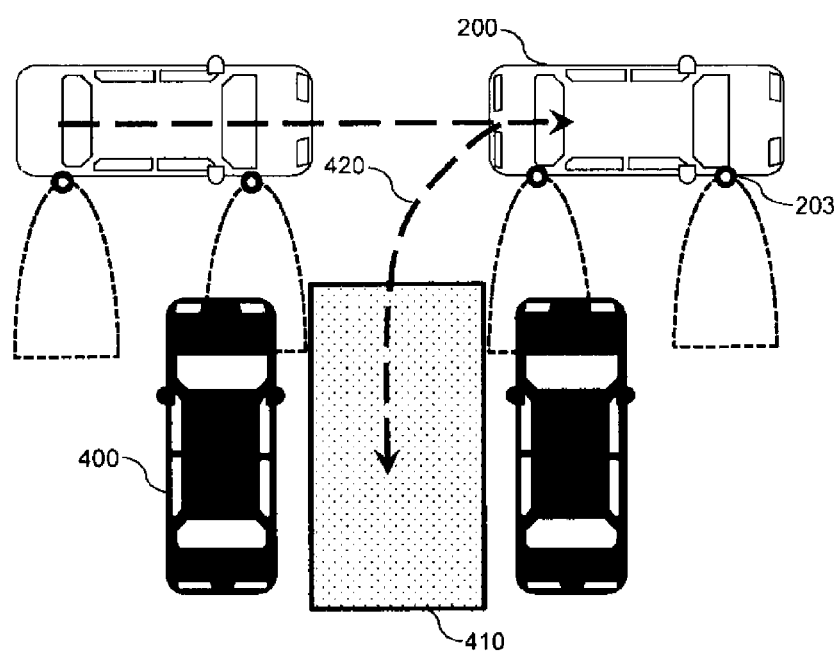
FIG. 4A is a diagram showing an example of a parkable space presented when only a side detector is used.
Figure 4B:
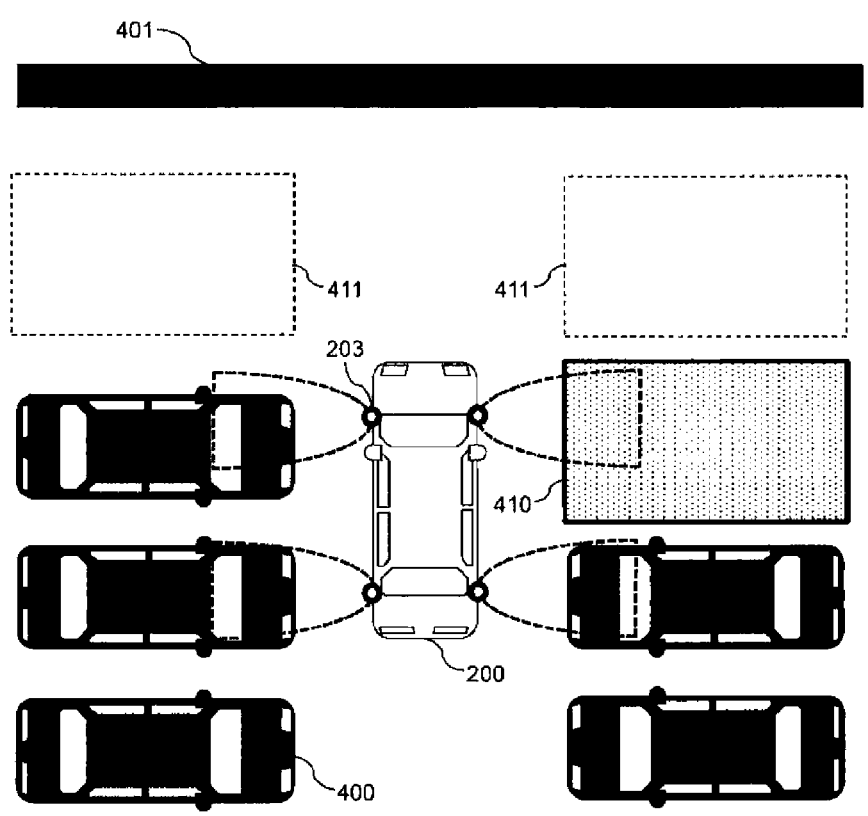
FIG. 4B is a diagram showing an example of a parkable space presented when only a side detector is used.
Figure 5:
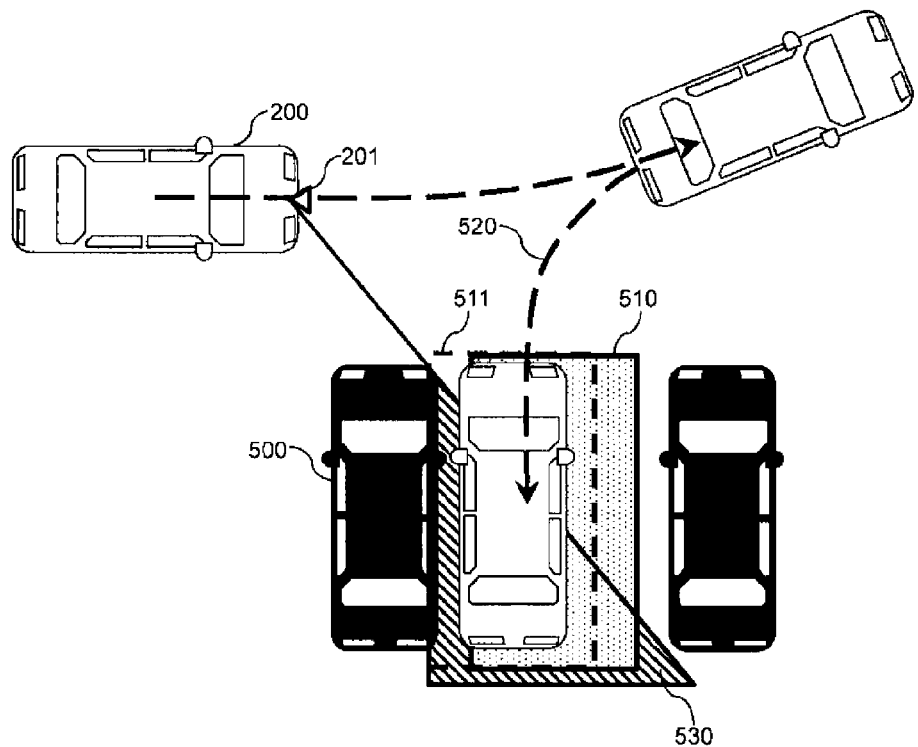
FIG. 5 is a diagram showing an example of a parkable space presented when only a front detector is used.

FIGS. 4A and 4B are diagrams showing examples of a parkable space presented when only the side detector 203 is used. FIG. 5 is a diagram showing an example of a parkable space presented when only the front detector 201 is used.

As shown in FIG. 4A, in order to detect an obstacle 400 using the side detector 203, the vehicle 200 needs to pass the obstacle 400 due to the detection range 213. Therefore, a parkable space 410 is not presented until the obstacle 400 is passed.

Further, as shown in FIG. 4B, when a wall 401 exists in the advancing direction of the vehicle 200, the vehicle 200 may not be able to pass the obstacle 400, so that the side detector 203 cannot detect the obstacle 400. Therefore, the parkable space 410 away from the wall 401 may be presented, but a parkable space 411 adjacent to the wall 401 may not be presented.

Further, as shown in FIG. 4A, since the parkable space 410 is presented after the obstacle 400 is passed, the moving route of the vehicle 200 to the parkable space 410 is a reverse route 420. Therefore, when the wall 401 as shown in FIG. 4B is present, it may be difficult to move to the parkable space 410.

As shown in FIG. 5, when the front detector 201 is used, it is possible to present a parkable space before passing an obstacle 500. However, due to a relationship between the detection range 211 and a position of the obstacle 500, there is an undetectable area 530. Therefore, when only the front detector 201 is used, information on presence/absence of an obstacle in the area 530, a shape of the obstacle, etc. cannot be obtained. Therefore, a parkable space 511 presented using only the front detector 201 may deviate from an ideal parkable space 510.

The above-mentioned positional deviation tends to increase as a relative distance between the front detector 201 and the parkable space 510 increases.

Therefore, when the vehicle 200 is parked along a moving route 520 in the parkable space 510 presented using only the front detector 201, there is a high risk that the vehicle 200 will collide with the obstacle 500.

FIGS. 6A, 6B, 6C, 6D, 6E, 6F, 6G, 6H, 6I, and 6J are diagrams explaining specific examples of the automatic parking control of the vehicle 200 of Example 1.

First, basic processing executed by the automatic parking assistance device 100 will be described with reference to FIGS. 6A, 6B, 6C, and 6D.

The front detector 201 detects an obstacle 600 and an obstacle 610, and outputs detection data to the automatic parking assistance device 100.

The space data generator 113 uses the detection data acquired from the front detector 201 to generate space data including coordinates of the obstacle 600 and the obstacle 610. Here, an end point 601 represents the right end point of the obstacle 600, and an end point 611 represents the left end point of the obstacle 610.

Figure 6A:
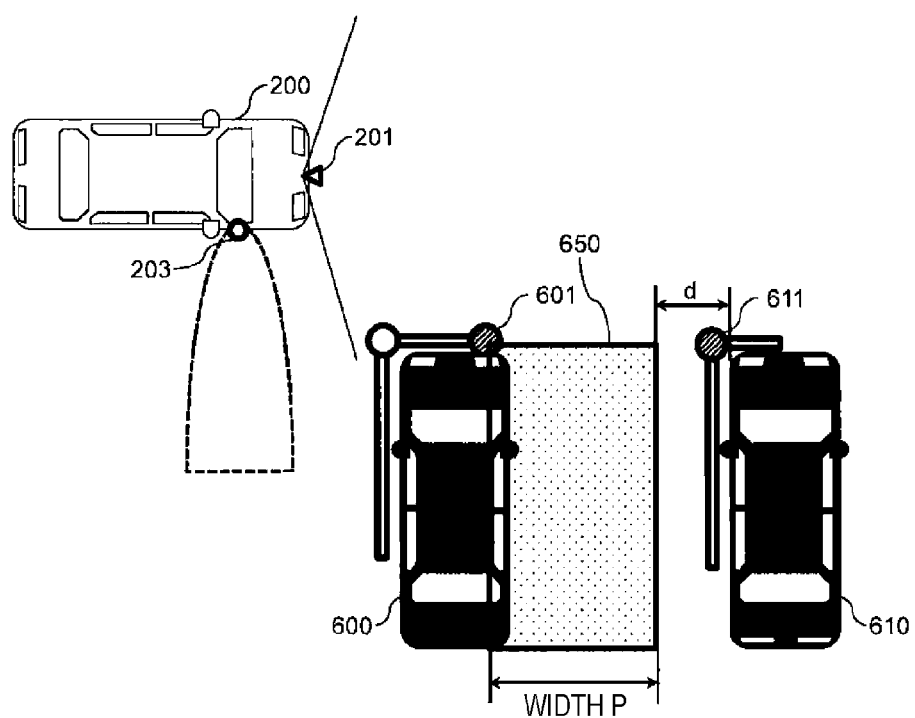
FIG. 6A is a diagram explaining a specific example of the automatic parking control of the vehicle of Example 1.

The parkable space setting unit 114 extracts a rectangular space between the end point 601 and the end point 611 as a margin space. When a width of the margin space is larger than the first threshold value, the parkable space setting unit 114 sets a parkable space 650 in a part of the margin space. In FIG. 6A, the parkable space setting unit 114 sets the parkable space 650 in a part of the margin space with reference to the end point 601. The parkable space 650 may be set with reference to the end point 611. Alternatively, the parkable space 650 may be set with reference to an intermediate position between the end point 601 and the end point 611.

When a plurality of the parkable spaces 650 can be set in the margin space, the parkable space setting unit 114 may set a parkable space closest to the vehicle 200 in the margin space, or may set as many parkable spaces as possible in the margin space.

The processing described above corresponds to the processing from steps S301 to S306. As a result, the automatic parking assistance device 100 can present the parkable space 650 to the driver before passing the obstacle 600 and the obstacle 610.

As described with reference to FIG. 5, an error occurs in detection of an obstacle using the front detector 201. For example, in FIG. 6A, the end point 601 is offset from the actual left end of the obstacle 600. Due to this error, a gap occurs between a space where no obstacle actually exists and the margin space. Therefore, as shown in FIG. 6A, the parkable space 650 may be presented at a position overlapping the obstacle 600. In this case, since the parkable space 650 is separated from the obstacle 610 by a distance d, there is room for adjusting the parkable space 650.

Figure 6B:
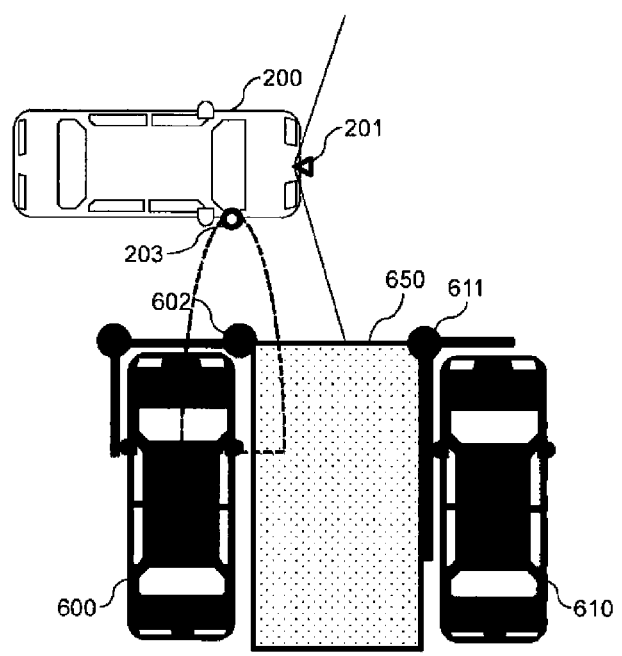
FIG. 6B is a diagram explaining a specific example of the automatic parking control of the vehicle of Example 1.

As shown in FIG. 6B, when the vehicle 200 passes the obstacle 600, the side detector 203 detects the obstacle 600 and outputs detection data to the automatic parking assistance device 100. In order to simplify the explanation, only one side detector 203 is shown.

When the error in the position of the obstacle 600 is larger than the second threshold value, the parkable space setting unit 114 updates the position of the obstacle 600 and further corrects the position of the parkable space 650. For example, the parkable space setting unit 114 translates the parkable space 650 by the error between the end point 601 and an end point 602.

There are the obstacle 600 and the obstacle 610 at both ends of the parkable space 650. Therefore, as shown in FIG. 6A, the parkable space setting unit 114 waits for an input of the detection data of the obstacle 610.

Figure 6C:
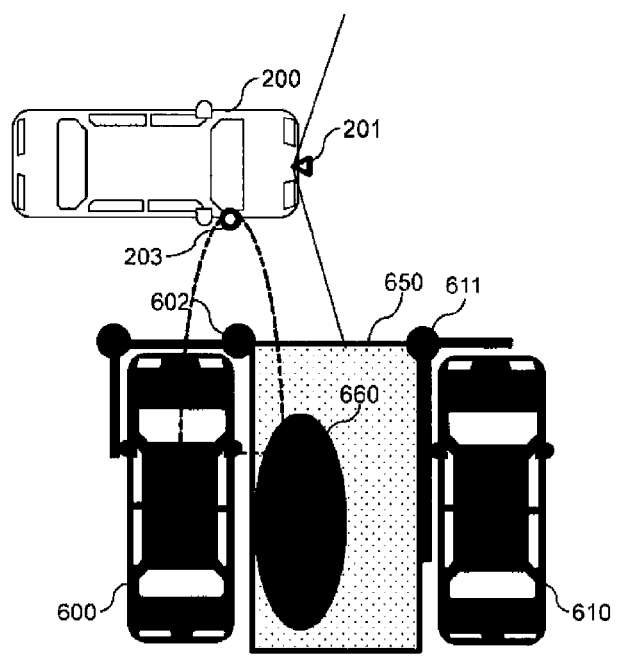
FIG. 6C is a diagram explaining a specific example of the automatic parking control of the vehicle of Example 1.

As shown in FIG. 6C, when an obstacle 660 is detected in the parkable space 650, the parkable space setting unit 114 deletes the parkable space data of the parkable space 650.

Figure 6D:
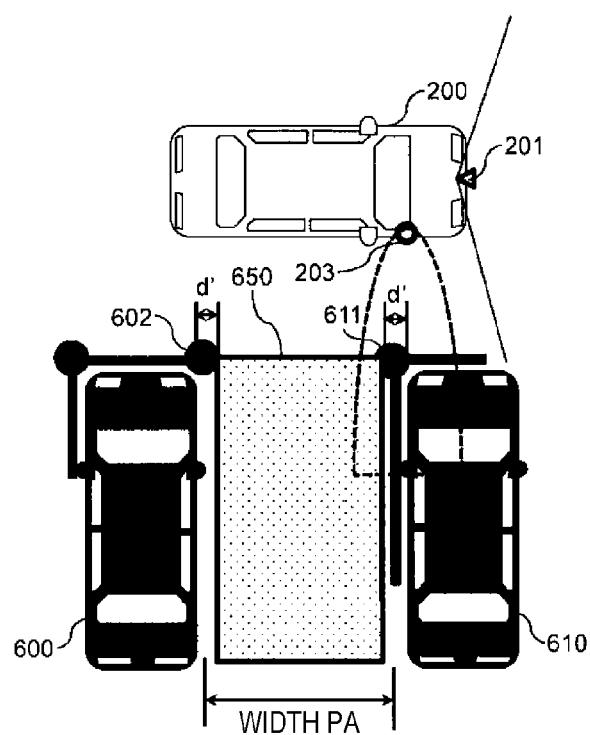
FIG. 6D is a diagram explaining a specific example of the automatic parking control of the vehicle of Example 1.

As shown in FIG. 6D, when the obstacle 610 is passed while the obstacle 660 is not detected, the parkable space setting unit 114 accepts the input of the detection data of the obstacle 610, and corrects the position of the parkable space 650 based on the positions of the obstacles 600 and 610 at both ends. As a result, the position of the parkable space 650 is corrected so that distances between the parkable space 650, and the obstacles 600 and 610 are equal as shown in FIG. 6D.

Since dist_L and dist_R are equal, either one may be used as a correction standard.

The processing described above corresponds to the processing from steps S310 to S318. By correcting the position of an obstacle using detection data acquired from the side detector 203 and correcting the position of a parkable space based on the correction result, the position of the parkable space can be corrected to an appropriate position resulting from detection accuracy of the front detector 201.

The automatic parking assistance device 100 of Example 1 further determines whether or not an occupant can get in and out when the vehicle 200 is parked in a parkable space based on the margin width of the parkable space. That is, it is determined whether or not the getting-in/getting-out space can be secured in the parkable space.

When the occupant can get in and out (when the getting-in/getting-out space can be secured), the parkable space setting unit 114 presents the corrected parkable space 650 to the driver.

When the occupant cannot get in and out and the remote automatic entry/exit function is installed, the parkable space setting unit 114 presents a display to encourage the driver to use the remote automatic entry/exit function and the corrected parkable space 650 to the driver. When the occupant cannot get in and out and the remote automatic entry/exit function is not installed, the parkable space setting unit 114 deletes the parkable space data of the corrected parkable space 650 from the space information storage unit 115.

The processing described above corresponds to the processing from steps S319 to S321 and steps S323 to S325.

When an operation for parking the vehicle 200 in the corrected parkable space 650 is accepted, the automatic parking assistance device 100 shifts to the automatic parking control mode.

The automatic parking assistance device 100 calculates the moving route 620 and starts controlling the control device.

Figure 6E:
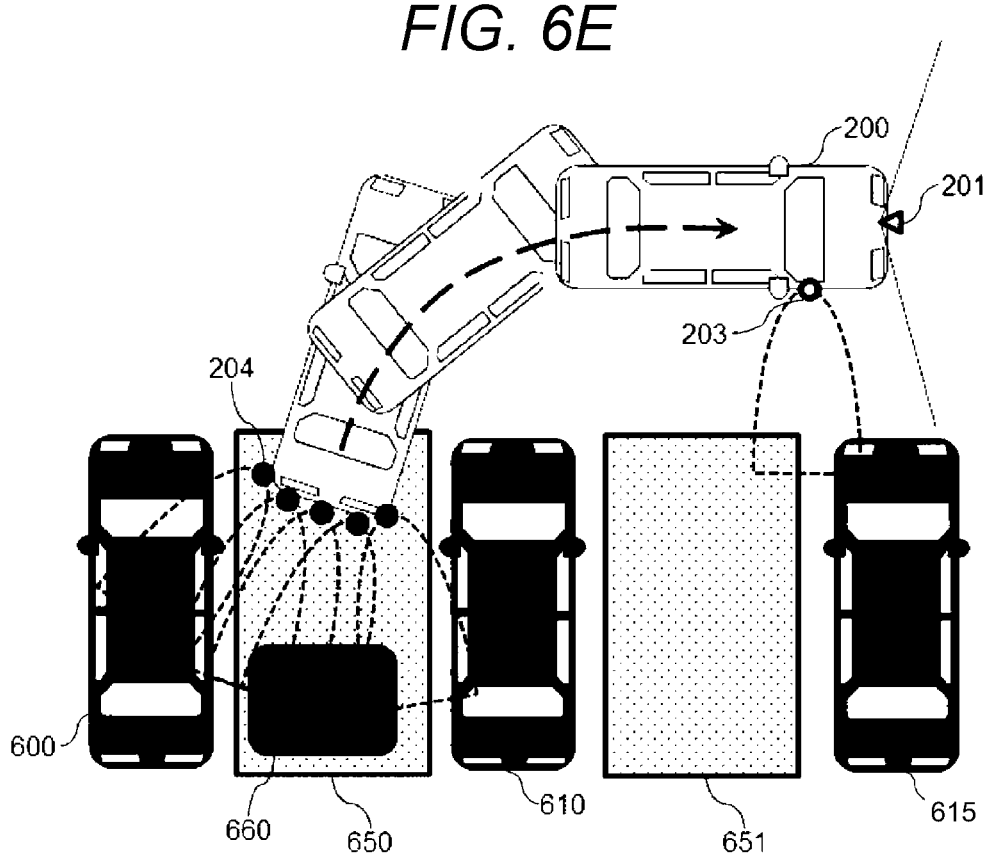
FIG. 6E is a diagram explaining a specific example of the automatic parking control of the vehicle of Example 1.

As shown in FIG. 6E, when the obstacle 660 is detected by the rear detector 204 while the vehicle 200 is moving to the parkable space 650, the automatic parking assistance device 100 cancels the automatic parking control mode and stops the vehicle 200. In addition, the automatic parking assistance device 100 reports the driver that parking is not possible, and deletes the parkable space data of the parkable space 650. The automatic parking assistance device 100 controls the control device to move the vehicle 200 to its original position before parking.

The automatic parking assistance device 100 presents a parkable space 651 set between the obstacle 610 and an obstacle 615 after the vehicle moves to its original position before parking. The automatic parking assistance device 100 makes the same correction for the parkable space 651.

The processing described above corresponds to the processing from steps S327 to S335.

Next, using FIGS. 6F, 6G, and 6H, the processing executed by the automatic parking assistance device 100 when an obstacle exists at a distance will be described.

The front detector 201 detects an obstacle 600 and an obstacle 610, and outputs detection data to the automatic parking assistance device 100.

The space data generator 113 uses the detection data acquired from the front detector 201 to generate space data including coordinates of the obstacle 600 and the obstacle 610.

The parkable space setting unit 114 extracts a rectangular space between the end point 601 and the end point 611 as a margin space. When the width of the margin space is larger than the first threshold value, the parkable space setting unit 114 sets the parkable spaces 650 and 651 in a part of the margin space. In FIG. 6F, the margin space is large enough to set two parkable spaces 650 and 651.

Here, the screen controller 119 controls the screen so as to present only the parkable space 650 close to the vehicle 200.

The processing described above corresponds to the processing from steps S301 to S306. As a result, the automatic parking assistance device 100 can present the parkable space 650 to the driver before passing the obstacles 600 and 610.

Figure 6F:
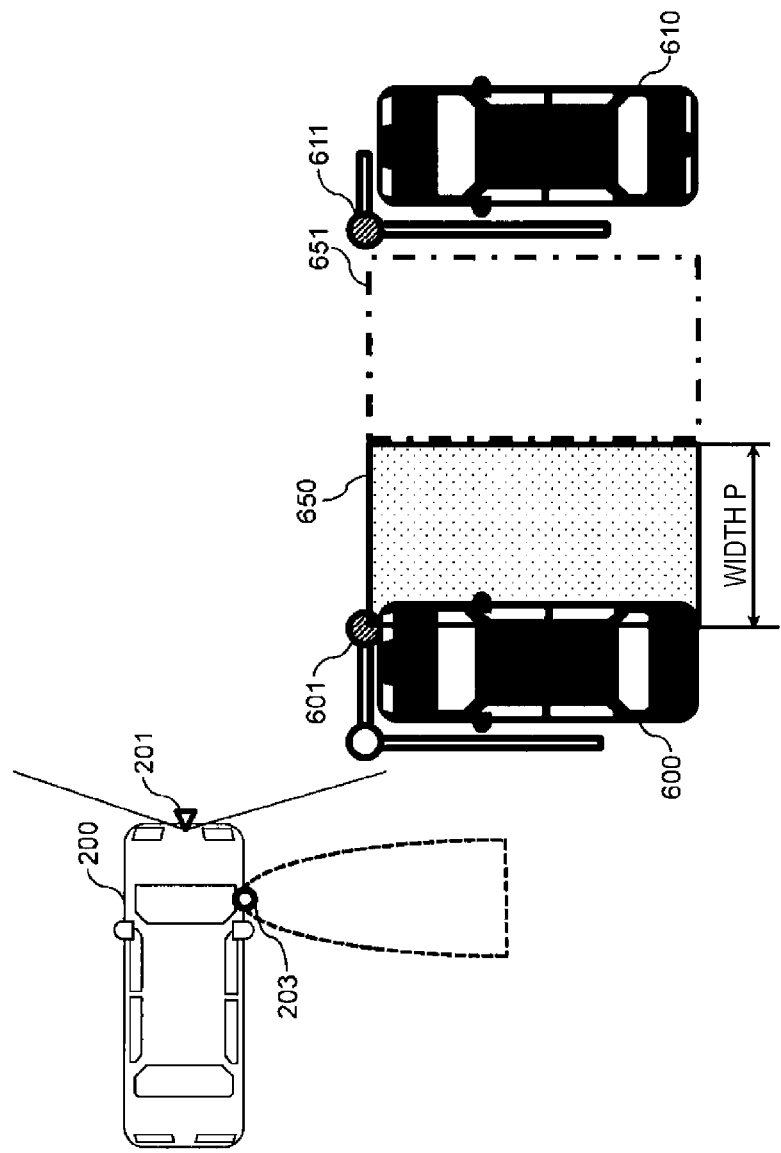
FIG. 6F is a diagram explaining a specific example of the automatic parking control of the vehicle of Example 1.

In FIG. 6F, the end point 601 is offset from the actual left end of the obstacle 600. Due to this error, a gap occurs between a space where no obstacle actually exists and the margin space. Therefore, as shown in FIG. 6F, the parkable space 650 may be presented at a position overlapping the obstacle 600.

Figure 6G:
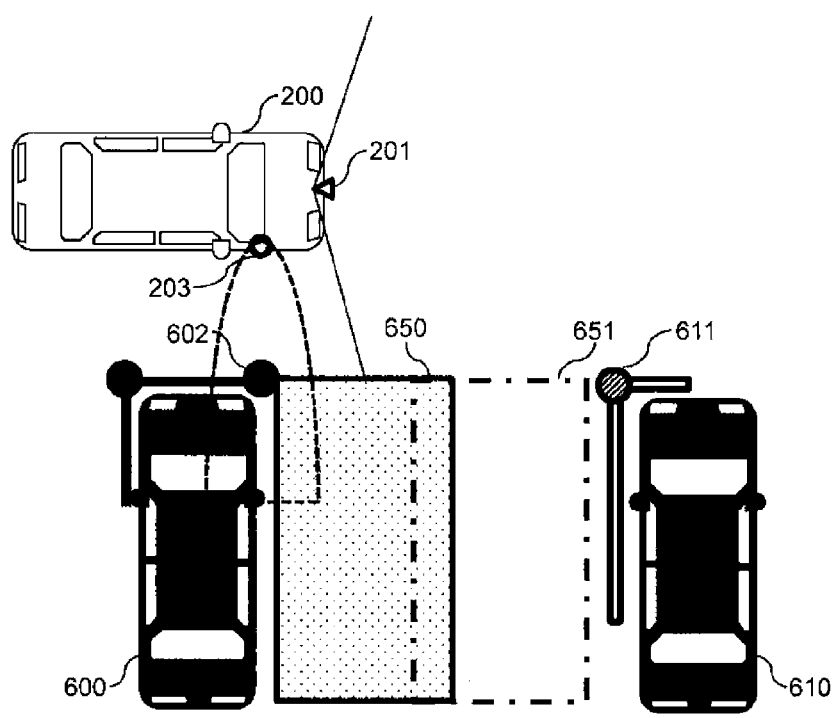
FIG. 6G is a diagram explaining a specific example of the automatic parking control of the vehicle of Example 1.

As shown in FIG. 6G, when the vehicle 200 passes the obstacle 600, the side detector 203 detects the obstacle 600 and outputs the detection data to the automatic parking assistance device 100.

When the error in the position of the obstacle 600 is larger than the second threshold value, the parkable space setting unit 114 updates the position of the obstacle 600 and further corrects the position of the parkable space 650. For example, the parkable space setting unit 114 translates the parkable space 650 by the error between the end point 601 and an end point 602.

When the distance between the parkable space 650 and the obstacle 610 is greater than the threshold value L, no correction is performed using both dist_L and dist_R. When the distance between the parkable space 650 and the obstacle 610 is equal to or less than the threshold value L, the parkable space setting unit 114 accepts the input of the detection data of the obstacle 610, and corrects the position of the parkable space 650 based on the positions of the obstacles 600 and 610 at both ends.

Figure 6H:
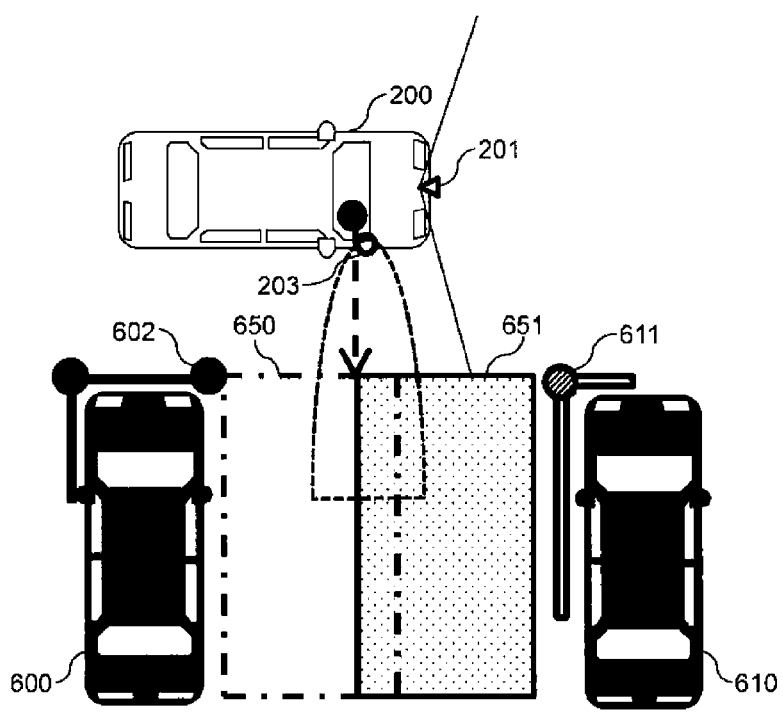
FIG. 6H is a diagram explaining a specific example of the automatic parking control of the vehicle of Example 1.

As shown in FIG. 6H, when the front detector 201 detects an obstacle 660 while passing by the parkable space 650, the parkable space setting unit 114 newly sets the parkable space 651. At this time, the screen controller 119 controls the screen so as to present only the parkable space 651.

Various methods can be considered for displaying the parkable spaces 650 and 651. For example, when the driver's getting-in position reaches the left end of the parkable space 651, the automatic parking assistance device 100 presents the parkable space 651 instead of the parkable space 650. In addition, the automatic parking assistance device 100 presents a new parkable space each time a parkable space is set.

The processing described above corresponds to the processing from steps S310 to S318.

Next, using FIGS. 6I, 6J, and 6K, the processing executed by the automatic parking assistance device 100 when distances of end points of obstacles to the tangent line indicating the advancing direction of the vehicle 200 on the moving routes 620 and 621 are different will be described.

The front detector 201 detects an obstacle 600 and an obstacle 610, and outputs detection data to the automatic parking assistance device 100. An area 630 indicates a range that cannot be detected by the front detector 201 at a current position of the vehicle 200.

The space data generator 113 uses the detection data acquired from the front detector 201 to generate space data including coordinates of the obstacle 600 and the obstacle 610.

Figure 6I:
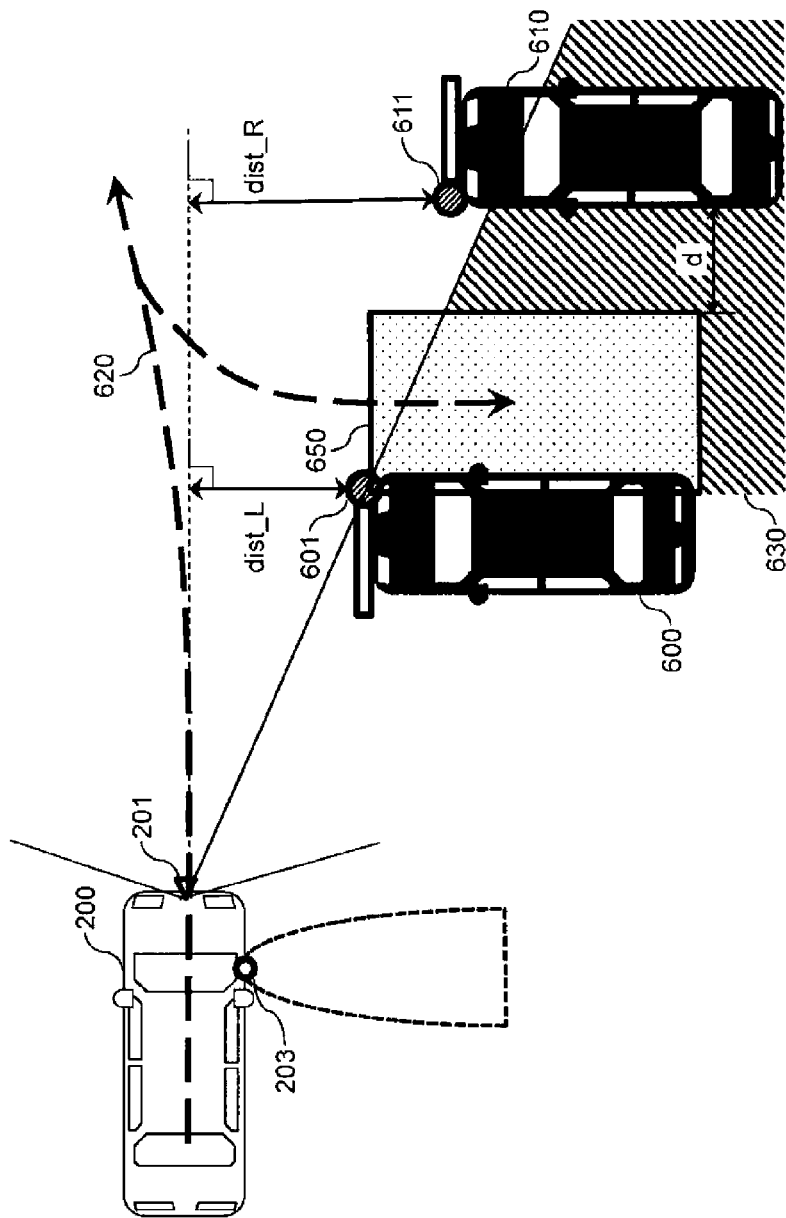
FIG. 6I is a diagram explaining a specific example of the automatic parking control of the vehicle of Example 1.
Figure 6J:
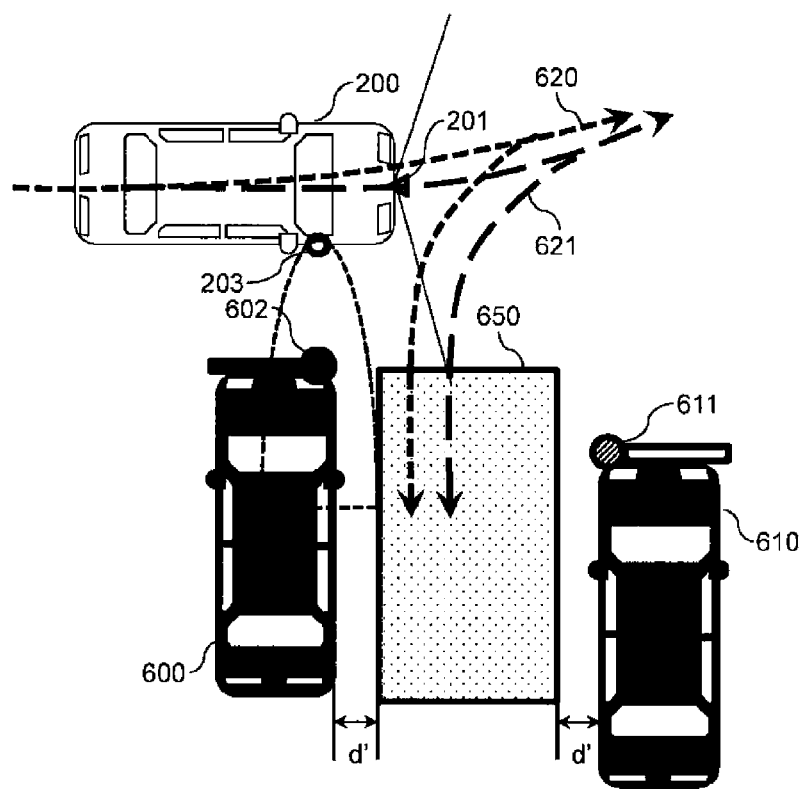
FIG. 6J is a diagram explaining a specific example of the automatic parking control of the vehicle of Example 1.
Figure 6K:
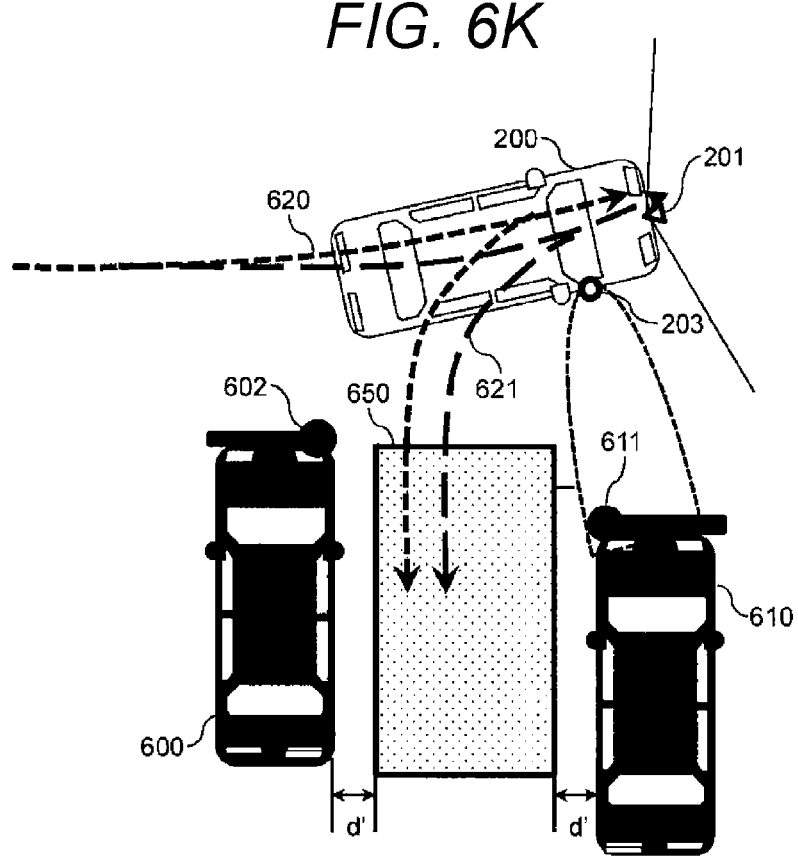
FIG. 6K is a diagram explaining a specific example of the automatic parking control of the vehicle of Example 1.

In the example shown in FIG. 6I, the parkable space setting unit 114 extracts the rectangular space between the end point 601 and the end point 611 as a margin space. When a width of the margin space is larger than the first threshold value, the parkable space setting unit 114 sets a parkable space 650 in a part of the margin space. In FIG. 6I, the parkable space setting unit 114 sets the parkable space 650 in a part of the margin space with reference to the end point 601. The parkable space 650 may be set with reference to the end point 611. Alternatively, the parkable space 650 may be set with reference to an intermediate position between the end point 601 and the end point 611.

When a plurality of the parkable spaces 650 can be set in the margin space, the parkable space setting unit 114 may set a parkable space closest to the vehicle 200 in the margin space, or may set as many parkable spaces as possible in the margin space.

The above processing corresponds to the processing from steps S301 to S306.

When the vehicle 200 passes the obstacle 600, the side detector 203 detects the obstacle 600 and outputs the detection data to the automatic parking assistance device 100.

When the error in the position of the obstacle 600 is larger than the second threshold value, the parkable space setting unit 114 updates the position of the obstacle 600 and further corrects the position of the parkable space 650. For example, the parkable space setting unit 114 translates the parkable space 650 by the error between the end point 601 and the end point 602, as shown in FIG. 6J.

There are the obstacle 600 and the obstacle 610 at both ends of the parkable space 650. Therefore, as shown in FIG. 6K, the parkable space setting unit 114 waits for the input of the detection data of the obstacle 610. When the detection data is input, the parkable space setting unit 114 corrects the position of the parkable space 650 based on the positions of the obstacles 600 and 610 at both ends. As a result, the position of the parkable space 650 is corrected so that distances between the parkable space 650, and the obstacles 600 and 610 are equal as shown in FIG. 6K.

At this time, since dist_L is smaller than dist_R, the end point 602 is used as a correction standard. A setting standard of the parkable space 650 before the correction is the end point 601. Since there is no error in a direction perpendicular to the advancing direction at the end point 601 and the end point 602, vertical correction of the parkable space 650 shown in FIG. 6K is not particularly performed.

The above processing corresponds to the processing from steps S310 to S318.

As shown in FIG. 6I, when the arrangement of the obstacle 600 is complicated, the area 630 that cannot be detected by the front detector 201 may occur. In this case, the distance between the parkable space 650 and the obstacle 610 becomes large, and the parkable space 650 overlaps the obstacle 600. Therefore, the parkable space setting unit 114 corrects the position of the parkable space 650 based on the information on the obstacles 600 and 610 detected by the side detector 203. In this way, the side detector 203 can be used to correct the parkable space in all directions.

Although the automatic parking control has been described with double-parking as an example in FIG. 6, the same control can be performed for parallel parking.

Figure 7A:
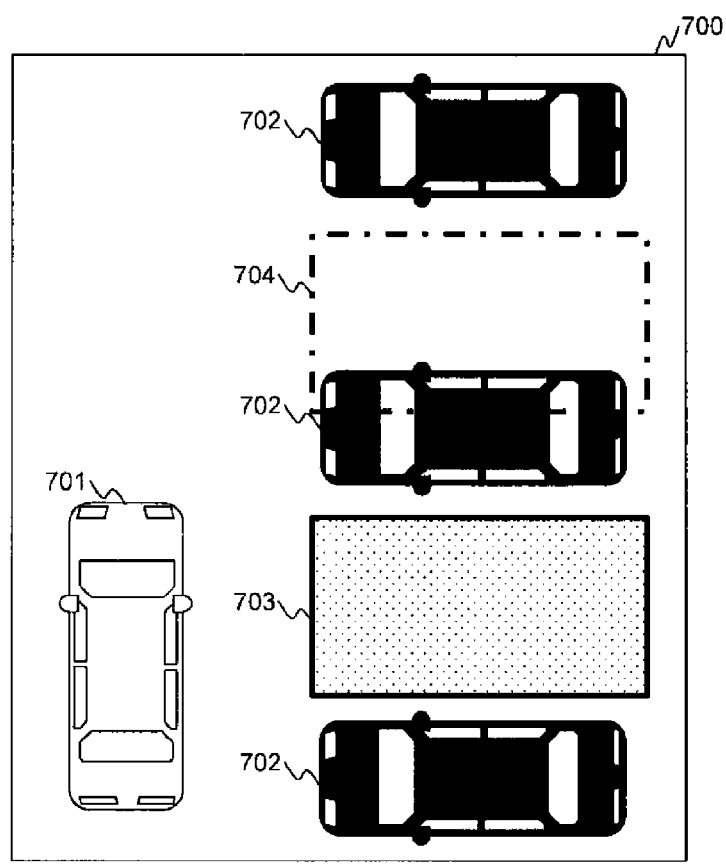
FIG. 7A is a diagram showing an example of a parkable space presented to a driver by a screen controller of the automatic parking assistance device of Example 1.
Figure 7B:
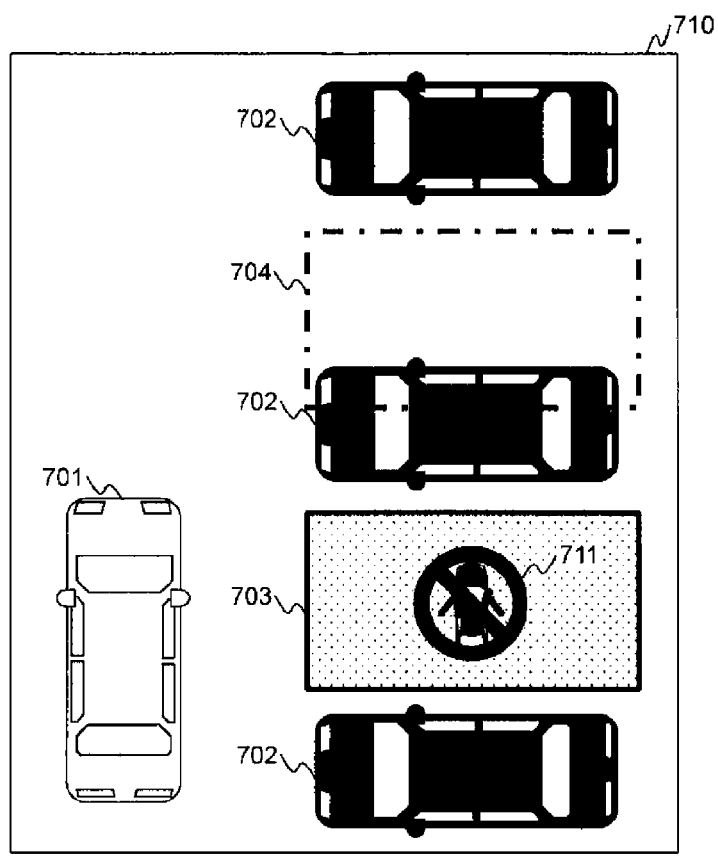
FIG. 7B is a diagram showing an example of a parkable space presented to a driver by a screen controller of the automatic parking assistance device of Example 1.

FIGS. 7A and 7B are diagrams showing examples of a parkable space presented to the driver by the screen controller 119 of the automatic parking assistance device 100 of Example 1.

FIG. 7A shows an example of a screen 700 of the HMI device 103 that presents a parkable space to the driver of the vehicle 200 that is not equipped with the remote automatic entry/exit function.

On the screen 700, an image showing a state of surroundings of the vehicle 200 as seen from above is displayed. An image in which symbols are superimposed on an image acquired by a camera of the front detector 201 may be displayed.

A symbol 701 represents the vehicle 200. A symbol 702 represents an obstacle such as another vehicle 200. A symbol 703 represents a corrected parkable space. A symbol 704 represents a parkable space that has not been corrected.

The symbol 703 and the symbol 704 are displayed with line types, line colors, and the like that have been changed so that the driver can distinguish the corrected parkable space from the uncorrected parkable space. For example, the uncorrected parkable space is indicated by a red dashed line, and the corrected parkable space is indicated by a green solid line. This helps parkable spaces be selected.

The method of presenting parkable spaces is not limited to the method described above. For example, parkable spaces may be distinguished from each other through reproduction of voice, display of characters, and the like.

FIG. 7B shows an example of a screen 710 of the HMI device 103 that presents a parkable space to the driver of the vehicle 200 equipped with the remote automatic entry/exit function.

A basic configuration of the screen 710 is the same as that of the screen 700. On the screen 710, a mark 711 is displayed. The mark 711 is a mark that encourages the driver to use the remote automatic entry/exit function. When the vehicle 200 is parked in the parkable space, the mark 711 is displayed for the parkable space where it is determined that the occupant cannot get in or out of the vehicle 200.

In addition, instead of a mark, the use of the remote automatic entry/exit function may be encouraged by a sound that reproduces voice and displays characters. In addition, the symbol for displaying the parkable space may be changed.

According to this example, the front detector 201 and the side detector 203 can be used to improve the detection accuracy of the parkable space and realize early presentation of the parkable space.

The present invention is not limited to the above-described examples, but includes various modifications and equivalent configurations within the scope of the attached claims. For example, the above-described examples have been described in detail in order to explain the present invention in an easy-to-understand manner, and the present invention is not necessarily limited to those having all the described configurations. Further, a part of the configuration of one example may be replaced with the configuration of another example. In addition, the configuration of another example may be added to the configuration of one example.

In addition, other configurations may be added/deleted/replaced with respect to a part of the configuration of each example.

Further, each of the above-described configurations, functions, processing units, processing means, etc. may be realized by hardware that designs a part or all of them by, for example, an integrated circuit, and may be realized by software that interprets and executes a program that realizes each function by a processor.

Information such as programs, tables, and files that realize each function can be stored in a storage device such as a memory, a hard disk, or a solid state drive (SSD), or a recording medium such as an integrated circuit (IC) card, an SD card, or a digital versatile disc (DVD).

In addition, the control lines and information lines indicate those that are considered necessary for explanation, and do not necessarily indicate all the control lines and information lines necessary for implementation. In practice, it can be considered that almost all configurations are interconnected.

REFERENCE SIGNS LIST 100 automatic parking assistance device
101 detection data input device
102 wheel speed measuring device
103 HMI device
104 driving force control device
105 braking force control device
106 steering control device
107 shift control device
111 detection data processor
112 vehicle position estimator
113 space data generator
114 parkable space setting unit
115 space information storage unit
116 parking position setting unit
117 parking route setting unit
118 control parameter setting unit
200 vehicle
201 front detector
202 front ranging unit
203 side detector
204 rear detector
211, 212, 213, 214 detection range
700, 710 screen
701, 702, 703, 704 symbol
710 screen
711 mark

The invention claimed is:

1. A parking assistance device for automatically parking a vehicle, comprising
 a front detector that is mounted on a front of the vehicle and collects first information about objects in the front of the vehicle;
 a side detector that is mounted on a side of the vehicle and collects second information about objects on the side of the vehicle;
 a human machine interface (HMI); and
 a processor that is communicatively coupled to the front detector, the side detector and the HMI,
 wherein the processor is configured to:
 determine a plurality of candidate parkable spaces for the vehicle based on first information from the front detector and, information acquired by the side detector when the vehicle passes by each respective parkable space among the plurality of the candidate parkable spaces,
 determine whether a remote entry/exit function is installed,
 selectively delete one or more of the plurality of the candidate parkable spaces when the remote entry/exit function is not installed to form a plurality of parkable spaces,
 display, using the HMI, the plurality of parkable spaces,
 receive, using the HMI, a selection of a target space from among the plurality of the parkable spaces, and
 control the vehicle to park in the target space in response to the selection.

2. The parking assistance device according to claim 1, wherein the plurality of candidate parkable spaces are determined based on at least:
 a position of an obstacle acquired by the front detector, or
 a position of an obstacle acquired by the side detector.

3. The parking assistance device according to claim 2, wherein the plurality of candidate parkable spaces are determined based on on coordinates of a point indicating a position of an obstacle adjacent to a particular parkable space from among the plurality of candidate parkable spaces that is acquired by the side detector.

4. The parking assistance device according to claim 2, wherein the plurality of candidate parkable spaces are determined based on at least
 on coordinates of a point indicating the position of the obstacle adjacent to a particular parkable space and coordinates of an intersection with a vertical line drawn from a point indicating a position of an obstacle adjacent to the particular parkable space acquired by the side detector to a tangent line indicating an advancing direction of the vehicle on a moving route.

5. The parking assistance device according to claim 1, wherein the HMI displays the plurality of parkable spaces by superimposing the plurality of parkable spaces on an image around the vehicle.

6. The parking assistance device according to claim 1, wherein the processor is further configured to when the remote entry/exit function is installed:
 form the plurality of parkable spaces as the plurality of the candidate parkable spaces,
 determine whether or not a getting-in/getting-out space for an occupant to get in and out of the vehicle can be secured in each particular parkable space among the plurality of parkable spaces, and
 display, using the HMI, each particular parkable space among the plurality of parkable spaces where the getting-in/getting-out space can be secured in the in a first distinguishable manner.

7. The parking assistance device according to claim 6, wherein the processor is further configured to when the remote entry/exit function is installed:
 display, using the HMI, each particular parkable space among the plurality of parkable spaces where it is determined that the getting-in/getting-out space cannot be secured in a second distinguishable manner.

8. The parking assistance device according to claim 7, wherein the processor is configured to when the remote entry/exit function is installed:
 display, using the HMI an alert that indicates that parking assistance can be remotely operated when it is determined that it is possible to park the vehicle in the target space but the getting-in/getting-out space cannot be secured.

9. The parking assistance device according to claim 1, wherein the front detector is a camera and the side detector is a sonar.

\* \* \* \* \*